United States Patent [19]

Form et al.

[11] Patent Number: 4,596,973

[45] Date of Patent: Jun. 24, 1986

[54] INDUCTIVE TRANSMITTER

[75] Inventors: Roland Form; Horst Welter, both of Linden, Fed. Rep. of Germany

[73] Assignee: VDO Adolf Schindling AG, Frankfurt am Main, Fed. Rep. of Germany

[21] Appl. No.: 687,618

[22] Filed: Dec. 31, 1984

[30] Foreign Application Priority Data

Jan. 12, 1984 [DE] Fed. Rep. of Germany ....... 3400870

[51] Int. Cl.⁴ ...................... H01F 27/02; H01F 21/00; H02K 21/38

[52] U.S. Cl. ..................................... 336/96; 336/110; 310/155

[58] Field of Search ...................... 336/110, 92, 90, 96; 310/155

[56] References Cited

U.S. PATENT DOCUMENTS 2,841,789  7/1958  Bassett, Jr. ........................ 336/90 X
3,201,729  8/1965  Blanchi et al. ..................... 336/96 X
3,255,512  6/1966  Lochner et al. ................... 336/96 X Primary Examiner—Arthur T. Grimley
Assistant Examiner—C. Romano
Attorney, Agent, or Firm—Martin A. Farber

[57] ABSTRACT

An inductive transmitter has a housing 1 within which two pole shoes 8, a permanent magnet 7 arranged between the pole shoes 8 and a coil 6 surrounding the permanent magnet 7 and the pole shoes 8 are arranged. The two ends of the coil 6 are connected with an output connection from which a cable 16 is conducted outwardly from the housing 1. The electric components, such as the coil 6, output connection pieces 9, 9' and output connection contacts 23, 23', are arranged in the watertight inside of the housing 1, while the permanent magnet 7 and the pole shoes 8 are received in a pot-shaped recess 14 developed communicatingly outside the inside of the housing in a coil support.

19 Claims, 8 Drawing Figures

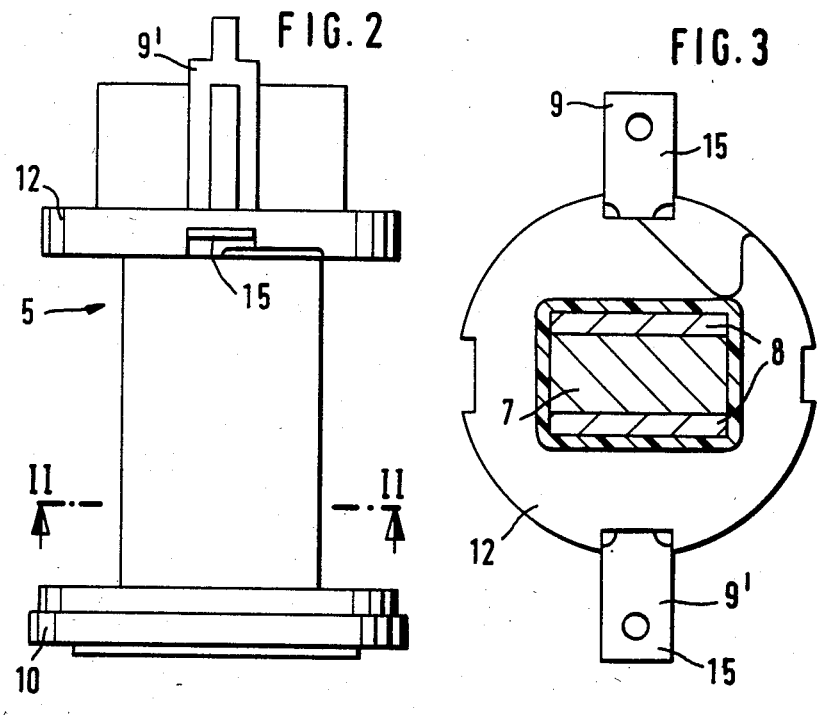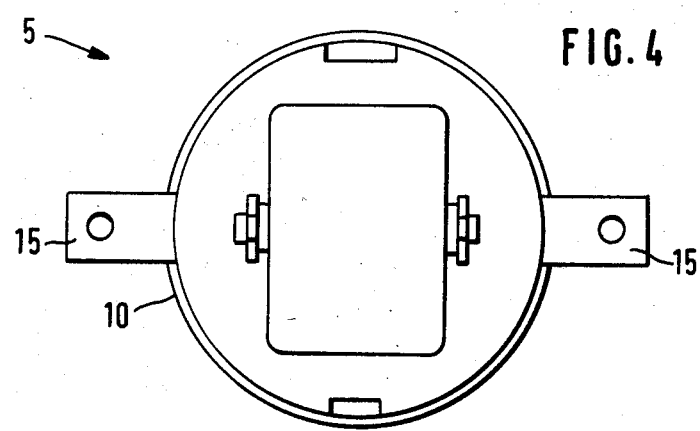

INDUCTIVE TRANSMITTER

FIELD AND BACKGROUND OF THE INVENTION

The present invention relates to an inductive transmitter having a housing containing two pole shoes, a permanent magnet arranged between the pole shoes and a coil surrounding the permanent magnet and the pole shoes, each end of the coil being connected to a separate output terminal from which a cable is conducted out of the housing.

In such inductive transmitters it is known to arrange the individual parts in a pot-shaped housing and to close this housing by a cover which is fastened by screws. The two pole shoes extend to the outside through openings in the cover while the cable is conducted to the outside through an opening in the bottom of the housing.

This arrangement is not only expensive to assemble but it also has the disadvantage that it is not watertight in view of the openings which extend from the outside into the inside of the housing. Thus, this inductive transmitter cannot be used in the open, for instance as a wheel rpm recorder in automotive vehicles.

The object of the present invention is therefore to create an inductive transmitter of the introductory-mentioned type which is watertight while being simple to manufacture.

SUMMARY OF THE INVENTION

This object is achieved, in accordance with the invention by forming the housing with an opening, which passes through it and into which opening there can be inserted a pot-shaped coil support which at its open end has a flange which tightly closes one mouth of the opening in the housing and which receives the permanent magnet and the pole shoes within its pot-shaped recess and which at its other end has, firmly attached to it, in protruding fashion two output connection pieces. Each of the connection pieces is connected with a respective end of the coil surrounding the coil support. Two output connection contacts are arranged fixed on the housing and connected with the cable, each of said contacts extending to a respective output connection piece and being conductively connected with it. A cover tightly closes the other mouth of the opening of the housing.

The coil support serves several functions. On the one hand it functions as a support part for the assembly comprising the output connection pieces, the pole shoes, the permanent magnet and the coil, which assembly can be pushed in assembled condition into the housing. On the other hand, the pole shoes and the magnet are arranged in the outwardly open pot-shaped recess so that no recess which leads to the inside of the housing is necessary for the pole shoes. In this way sealing problems are avoided. Furthermore, the flange of the coil support at the same time forms the closure for the first-mentioned mouth of the opening of the housing.

Since, after the coil support has been inserted into the housing, the output connection pieces and output connection contacts are easily accessible through the other mouth of the opening of the housing and can be conductively connected with each other and it is now merely necessary only to close this mouth with the cover, mounting is effected by only a few simple manipulations. This also readily permits machine mounting of the inductive transmitter.

Ease of manufacture is furthermore obtained in the manner that the housing and/or the coil support and/or the cover are injection moldings. It is favorable if the cover and flange as well as the mouths of the opening of the housing are developed with rotational symmetry.

Accurate positioning upon insertion of the coil support into the housing is obtained in the manner that cover and/or flange are inserted in step-like radially encircling recesses at the mouths of the opening of the housing. In addition, interengaging axial guides which assure a correct positioning of the radial assembly can also be provided on the housing and the coil support.

A high degree of assurance against the penetration of water into the housing is obtained in the manner that cover and/or flange are welded to the housing, it being particularly advantageous for the cover and/or flange to be ultrasonically welded to the housing.

In order to secure the pole shoes in their position, the pole shoes and magnet can be bonded together. No special assembling measures of fastening devices for the output connection pieces are required in view of the fact that the output connection pieces are cast into the coil support, one end of an output connection piece extending out to the coil and the other end out of the bottom side of the coil support.

If the coil-side ends of the output connection pieces can be bent so as to extend radially outwardly from the region of the coil then, with radially outward directed ends, the region of the coil is completely free. This makes it possible to wind the coil without interference. The ends of the output connection pieces are then bent into the region of the coil and conductively connected there with one respective end of the coil, for instance by soldering.

Also in the case of the output connection contacts it is possible to dispense with special mounting measures and fastening devices if the output connection contacts and the cable end connected thereto are cast into the housing. In this case, the output connection contacts are preferably rigid so that upon the insertion of the coil support the output connection pieces and output connection contacts are automatically brought into the correct position to each other. They need only be connected in electrically conductive manner with each other. This process can be carried out particularly easily if the output connection contacts extend approximately radially into the opening of the housing and have recesses into which the output connection pieces extend.

One simple way for making the conductive connection to each other resides in the output connection contacts and output connection pieces being soldered together. In order to hold the cable on the housing, the end of the cable cast into the housing can be surrounded by a bushing.

In order to prevent moisture from penetrating into the inside of the housing between the cable covering and the bushing, the cable can have a plastic covering on which the bushing, which is made of plastic, is tightly provided by cross-linking.

If the bushing is developed on its outer cylindrical surface with radially encircling extensions arranged alongside of each other then the extensions form both a strain relief as well as a labyrinth packing.

If the extensions are of triangular cross section then particularly high application pressures result at their tips as a result of the material of the housing, so that the sealing effect is further increased.

If the bushing is made of a resilient plastic then the connection to the bushing can achieve particularly high tightness due to the shrinking of the material of the housing after the injection molding.

One embodiment of the invention is shown in the accompanying drawings and will be described by way of example in further detail below with reference thereto.

BRIEF DESCRIPTION OF THE DRAWINGS

FIG. 2 is a side view of the coil support of the inductive transmitter of FIG. 1;

FIG. 3 is a cross section along the line II—II of FIG. 2;

FIG. 4 is a top view of the coil support of FIG. 2;

DETAILED DESCRIPTION OF THE PREFERRED EMBODIMENT

Figure 1:
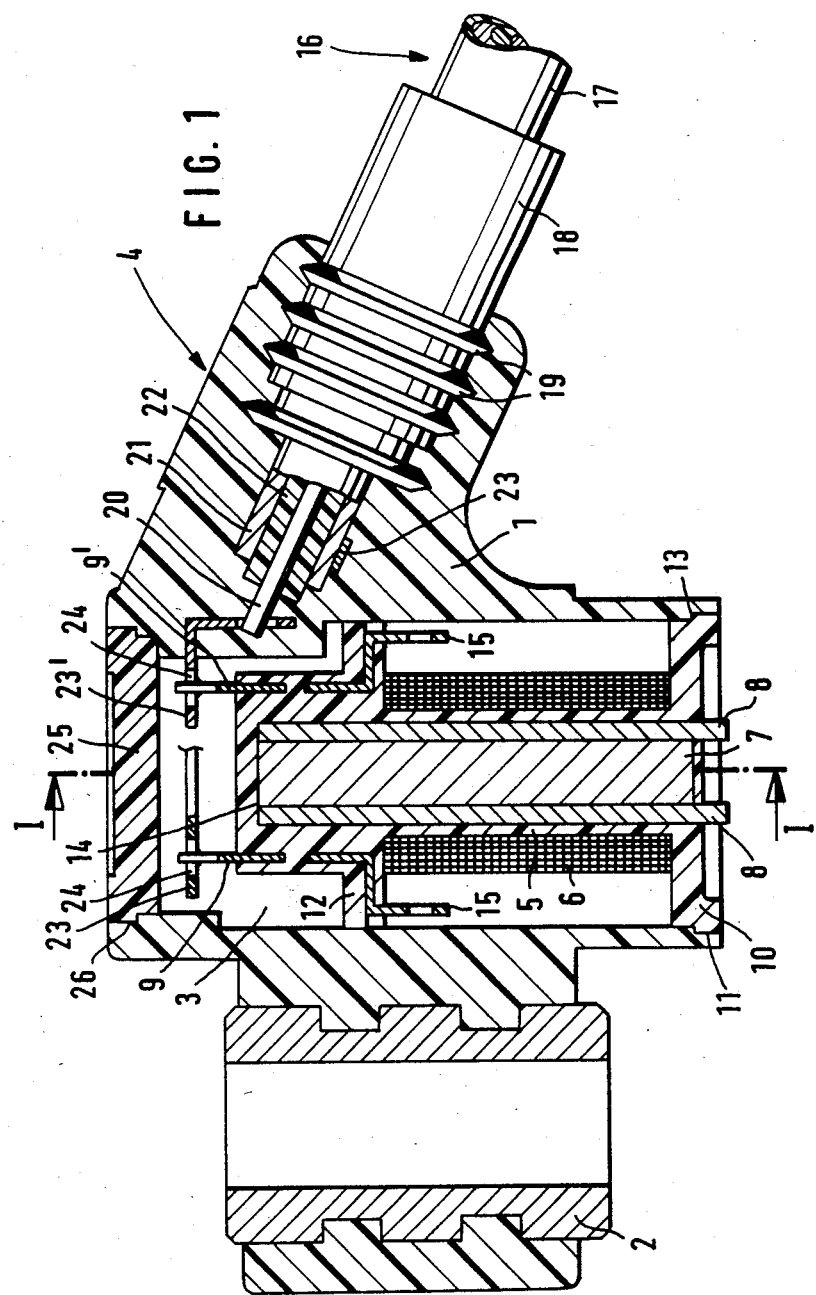
FIG. 1 is a cross section through an inductive transmitter of the invention.
Figure 5:
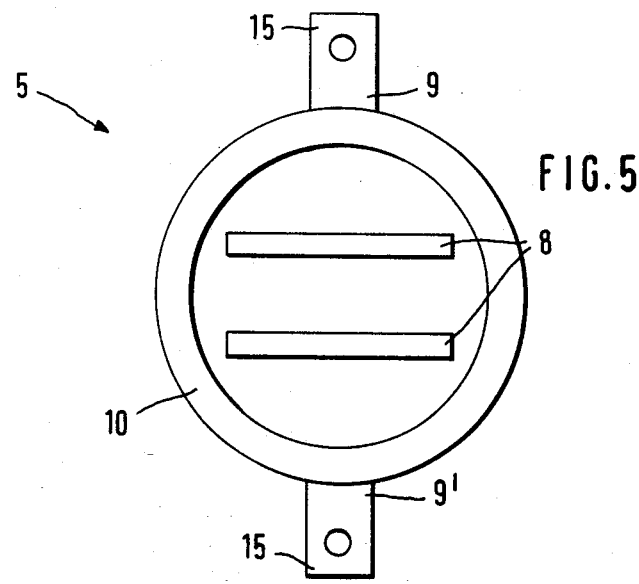
FIG. 5 is a bottom view of the coil support of FIG. 2.

The inductive transmitter shown in the drawing has a housing 1 with a fastening socket 2, a continuous opening 3 and a cable connection 4.

In the opening 3, which is of rotational symmetry, there is inserted an assembly comprising a coil support 5, a coil 6, a permanent magnet 7, two pole shoes 8 and two output connection pieces 9 and 9'. The coil support 5 at the same time forms the support part for the other components of this assembly. The coil support 5 furthermore has a flange 10 by which the lower mouth of the opening 3 is closed.

The coil support is guided centrally within the opening 3 both by the flange 10 and a flange 12. The flange 10 is inserted in a step-like radially encircling recess 11 which extends into the lower mouth. The flanges 10 and 12 bound the region of the coil on both axial ends.

In axial direction, the coil support 5 is fixed in its correctly installed position by the axial application of the flange 10 against the bottom 13 of the recess 11.

The coil support 5 has a pot-shaped recess 14 which has no communicating connection with the inside of the housing and within which the permanent magnet 7 and the two pole shoes 8 are arranged.

Figure 6:
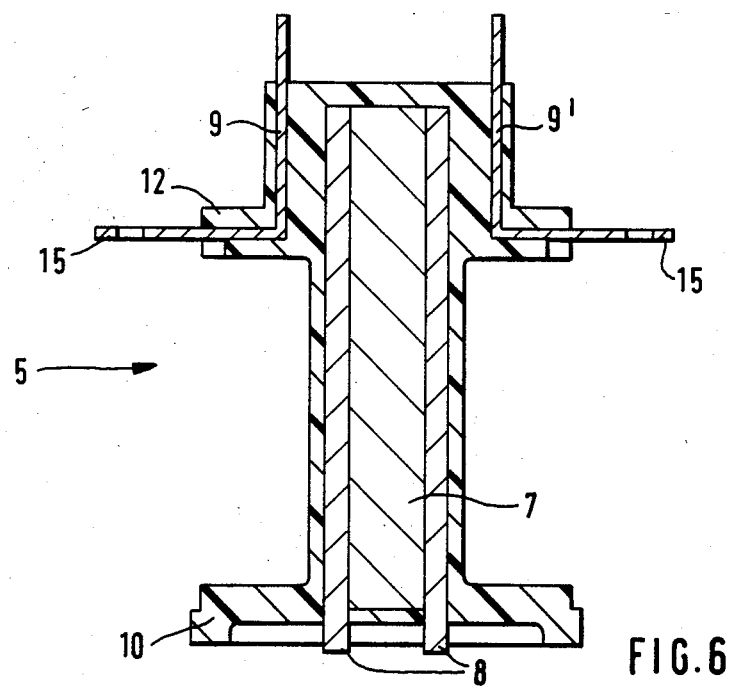
FIG. 6 is a cross section through the coil support of FIG. 2.
Figure 7:
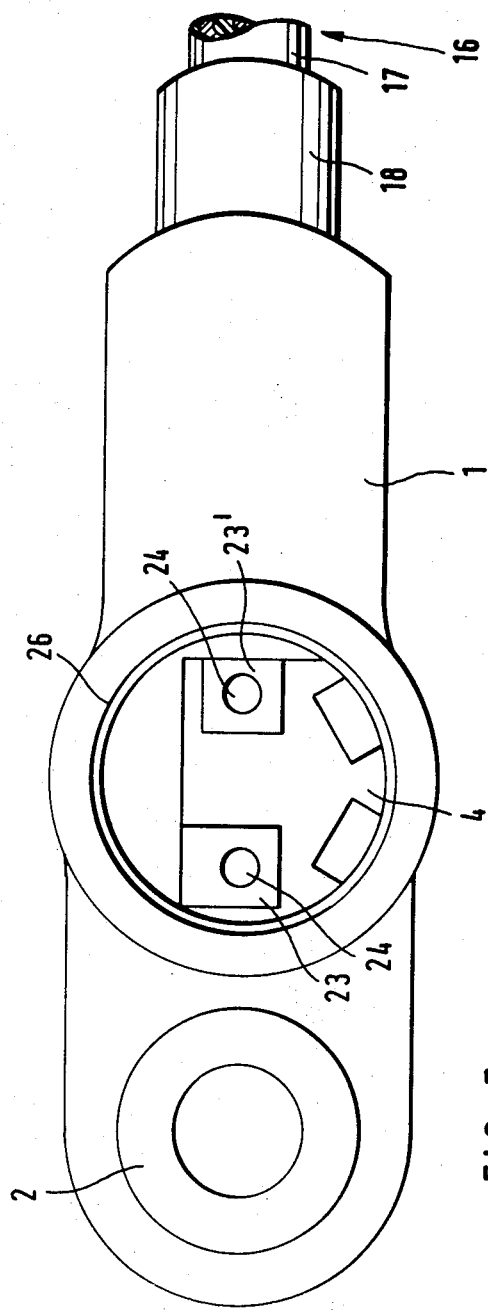
FIG. 7 is a top view of the inductive transmitter of FIG. 1.
Figure 8:
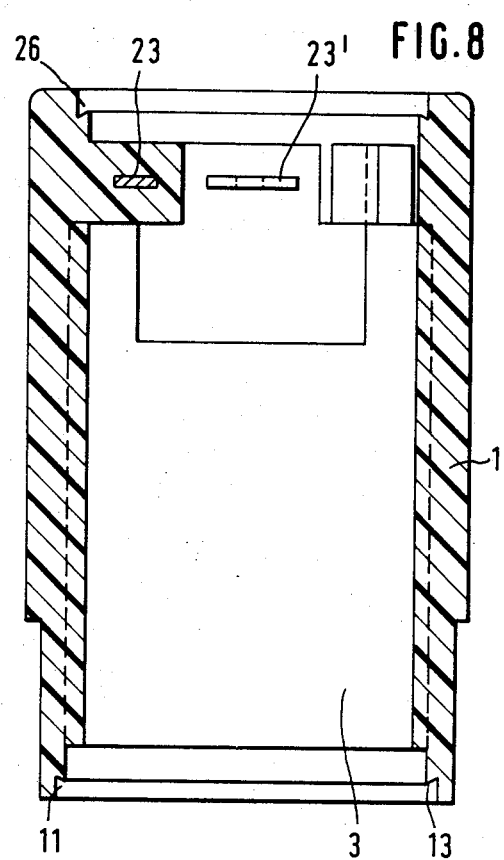
FIG. 8 is a cross sectional view of the housing of the inductive transmitter of FIG. 1 along the line I—I.

The coil support 5 is an injection molded part made of plastic. For the injection molding the output connection pieces 9 and 9' are inserted into a mold in the form of angularly bent parts, each having an axially directed end and a radially outwardly directed end 15 (FIG. 6), together with the pole shoes 8 which have been previously bonded to the permanent magnet 7. Then casting is effected around them. In this way, the recess 14 is closed except for the outward extending ends of the pole shoes 8 so that the pole shoes 8 and permanent magnet 7 are held fast.

The ends of the output connection pieces 9 and 9' which extend from the inside of the mold through recesses also remain free. Since the coil-side ends 15 of the output connection pieces 9 and 9' extend radially outwards, the coil 6 can be wound between the flanges 10 and 12 without interference. The ends 15 are then bent over towards the coil 6 and connected with the ends of the coil by soldering. The cable connection 4 comprises a cable 16 having a plastic covering 17 over which a bushing 18 is tightly arranged by cross-linking. The plastic covering 17 and the bushing 18 preferably are made of polyurethane.

The bushing 18 has radially encircling extensions 19 of triangular cross section on the region of the bushing which is surrounded by the housing 1. These extensions result, after the casting, in an extremely tight and strong connection to the housing 1.

The cable 16 has a coaxial conductor 20 and a conductor 21 of annular cross section surrounding it, an insulating layer 22 being arranged between said two conductors.

Before the casting, the coaxial conductor 20 is connected by soldering to a rigid output connection contact 23 and the conductor 21 is connected by soldering to an output connection contact 23'.

This assembly is inserted in correct position into a casting mold for the housing 1 and plastic is cast around it by injection molding. The free ends of the output connection contacts 23 and 23' extend in this connection radially into the opening 3 of the housing 1. These free ends have holes 24 into which, upon the insertion of the coil support 5, the free ends of the output connection pieces 9 and 9' extend and need only still be soldered. After the soldering, a cover 25 of plastic is inserted into the upper mouth of the opening 3 which is provided with a radially encircling step-like recess 26 and connected tightly to the housing 1 by ultrasonic welding. The flange 10 is also connected tightly to the housing 1 by ultrasonic welding so that the inside of the housing and the electrical components arranged therein are reliably protected from the penetration of moisture.

We claim:

1. In an inductive transmitter having a housing containing two pole shoes, a permanent magnet arranged between the pole shoes, and a coil surrounding the permanent magnet and the pole shoes, the coil having two ends which are connected with respective of two output connection pieces from which a cable leads to outside of the housing, the improvement wherein the housing is formed with a continuous opening having two mouths, a pot-shaped coil support being inserted into said opening, said coil support forming a pot-shaped recess with an open end, the open end formed with a flange tightly closing one of said mouths of said opening of the housing, said permanent magnet and the pole shoes are disposed in said pot-shaped recess, said coil surrounding the coil support, each of said two output connection pieces respectively is connected with a respective end of said ends of said coil and is firmly attached in protruding manner to the other end of said coil support, two output connection contacts being arranged fixed on the housing and connected with the cable, each of said output connection contacts extending to and conductively connected to a respective of said output connection pieces, and a cover tightly closing the other of said mouths of the opening of the housing.

2. The inductive transmitter according to claim 1, wherein said housing, said coil suport and said cover are parts, and at least one of said parts is an injection molding.

3. The inductive transmitter according to claim 1, wherein said cover and said flange, as well as the mouths of said opening of the housing have rotational symmetry.

4. The inductive transmitter according to claim 1, wherein said housing defines a step-shaped radially encircling recess on at least one of the mouths of the opening of the housing, said cover and said flange are parts, and at least one of said parts is inserted into said step-shaped radially encircling recess.

5. The inductive transmitter according to claim 1, wherein said cover and said flange are parts, and at least one of said parts is welded to said housing.

6. The inductive transmitter according to claim 5, wherein said cover and said flange are parts, and at least one of said parts is ultrasonically welded to the housing.

7. The inductive transmitter according to claim 1, wherein said pole shoes and said permanent magnet are bonded to each other.

8. The inductive transmitter according to claim 2, wherein said output connection pieces are cast into said coil support, one end of each of said output connection pieces extends out to said coil and the other end extends out of a bottom side of said coil support.

9. The inductive transmitter according to claim 8, wherein said one ends of said output connection pieces are bendable so as, in a manufacturing stage of the transmitter, to extend radially outwardly away from the coil.

10. The inductive transmitter according to claim 2, wherein said output connection contacts and an end of said cable adjoining said output connection contacts are cast into said housing.

11. The inductive transmitter according to claim 10, wherein said output connection contacts are rigid.

12. The inductive transmitter according to claim 10, wherein said output connection contacts extend approximately radially into said opening of the housing and are formed with holes, said output connection pieces extend into said holes.

13. The inductive transmitter according to claim 1, wherein said output connection contacts and said output connection pieces are soldered to each other.

14. The inductive transmitter according to claim 10, further comprising a bushing surrounding said end of said cable end which is cast into the housing.

15. The inductive transmitter according to claim 14, further comprising a plastic covering on said cable, said bushing is made of plastic and is tightly arranged, on said covering, by cross-linking.

16. The inductive transmitter according to claim 14, wherein said bushing has an outer wall surface formed with radially encircling extensions arranged alongside of each other.

17. The inductive transmitter according to claim 16, wherein said extensions have a triangular cross section.

18. The inductive transmitter according to claim 14, wherein the bushing is made of resilient plastic.

19. The inductive transmitter according to claim 1, further comprising interengaging axial guides on the housing and the coil support.

* * * * *